United States Patent Office 3,454,671
Patented July 8, 1969

3,454,671
POLYURETHANES HAVING IMPROVED DYE-
ABILITY, LIGHT FASTNESS AND FASTNESS
TO WASTE GASES AND METHOD OF PRE-
PARING THE SAME
Harald Oertel, Heinrich Rinke, and Friedrich Karl Rosen-
dahl, Leverkusen, Germany, assignors to Farben-
fabriken Bayer Aktiengesellschaft, Leverkusen, Ger-
many, a German corporation.
No Drawing. Filed Nov. 2, 1964, Ser. No. 408,344
Int. Cl. C08g 23/20
U.S. Cl. 260—859       15 Claims

ABSTRACT OF THE DISCLOSURE

Polyurethane fibers having improved dyeability, light fastness and fastness to waste gases have chemically incorporated therein a stabilizing amount of an organic compound containing (1) at least one tertiary aliphatic substituted amino group and (2) at least one group reactive with the polyurethane polymer including ethyleneimido groups, epoxy groups, isocyanate splitting groups, N-methylol groups and N-methylolether groups.

---

This invention relates to shaped articles from polyurethanes having improved dyeability, light fastness and fastness to waste gases and a method of preparing the same. More particularly, it relates to improved spandex fibres.

Highly elastic threads and fibers based on polyurethanes (spandex) are used for many different textile purposes, especially in the corset industry, for elastic garments or stockings, in which they are spun round with staple fibers as so-called core spun elastomer yarns, and as stable fiber admixtures to non-elastic fibers for the purpose of improving the wearing properties of fabrics which are not in themselves highly elastic.

Compared with rubber threads, these elastic polyurethane threads have numerous advantages; they can be made in practically any degree of fineness for textile purposes, they have higher tensile strength and abrasion resistance, in many cases higher resilience, they are to a large extent resistant to cosmetic oils and solvents used in chemical cleaning processes and in contrast to rubber threads they can be dyed relatively easily with certain dyestuffs such as dispersion dyestuffs. However, in spite of these obvious advantages, they are still unsatisfactory, for example, with regard to their sensitivity to the action of nitrous gases or waste gases of combustion. In addition, it would appear very desirable to improve their dyeability with respect to numerous classes of dyestuffs. This is true particularly of certain important groups of dyestuffs such as acid dyestuffs, metal complex dyestuffs or chrome dyes with which polyamides, which are preferentially used in combination with elastic polyurethane fibers, can be dyed to give fast colors in deep tones.

For stabilizing highly elastic polyurethane compounds with the grouping

—Ar—NHCONH—(CH$_2$)$_n$NHCONH—Ar—

($n$=0, 1), such as are obtainable from aromatic polyisocyanates and diamines or hydrazine, against discoloration by light and waste gases, it has already been proposed in German Auslegeschrift 1,126,603 to add to the polymer solutions primary, secondary and/or tertiary amines or polymeric compounds with aliphatically bound amino groups and a minimum molecular weight of 280 in stabilizing quantities. It is definitely stated that in order to be effective the stabilizing amino compounds must be present as independent chemical compounds in the compositions and the polymer must not contain any groups which could react with the sabilizing compounds.

However, it has been found in practice that although in some cases, the desired stabilizing effect can be achieved by adding primary or secondary amines to the polyurethane compositions, in these solutions, if the shaped polyurethane articles produced from them are left to stand or stored and especially if they are given a subsequent heat treatment, very rapid and extensive degradation of the polyurethane molecules takes place, which has an adverse effect on the viscosity properties and the mechanical and elastic properties of the polyurethane articles. Morever, the addition of primary and secondary amines frequently causes very strong discolorations in the polyurethane spinning solutions. This is true particularly of solutions of polyurethanes built up with hydrazide compounds as chain lengthening agents.

The degradation of the polymers by the additives can be explained by the fact that the amines dissolve allophanate-, biuret- or uretdione bonds, i.e. cross-linking bonds and may also cause the break-up of linear chains, possibly by aminolysis of ester bonds in polyester urethanes.

The primary and secondary amines have such great preference for reacting with the added cross-linking agents, e.g. polyisocyanates, epoxides, formaldehyde or ethylene imine derivatives, that cross-linking of the polymers is almost or completely impossible.

According to the state of the art, tertiary amines when added to the polyurethane solutions, generally manifest only a slight influence or none at all on the stability of the solutions of polyurethanes and are therefore preferred.

Low molecular weight tertiary amines, however, are practically never to be used despite the fact that they are effective to a certain extent, because they are volatile or washed too easily out of the polyurethane molding compounds. Attempts have therefore been made to reduce the water-solubility of the amines by increasing the molecular weight.

However, in view of the solubility of almost all amines, even high molecular weight tertiary amines, e.g., poly-(N,N-diethyl-$\beta$-aminoethyl-methacrylate), in dilute acids (i.e. dilute sulphuric acid, dilute formic or acetic acid), the achieving of a really durabe stabilization is questionable. Particularly in finishing, bleaching and dyeing treatments, threads and fibers are exposed with their large surface areas to aqueous and partly acid baths, which results in the extraction of amines even of high molecular weight from the polymer. Extraction easily occurs in the acid pH range, especially in the presence of solvents that have a slight swelling effect, and this frequently leads to a relatively poor fastness to washing and perspiration in the dyed articles. Moreover within the dyestuff-solutions there are formed colored complexes of the added tert. amine compounds and dyestuffs, which settle on fibres and the beaker.

It is, therefore, an object of this invention to provide improved shaped articles of polyurethane polymers. It is another object of this invention to provide spandex fibers of improved dyeability, light fastness and fastness and fastness to waste gases. It is still another object of this invention to provide additives for spandex fibres that improve dyeability, light fastness and fastness to waste gases, e.g. combustion gases, acid fumes and oxidies of nitrogen.

The foregoing objects and others which will become apparent from the following description are accomplished in accordance with the invention generally speaking by providing spandex fibers having improved dyeability, light fastness and fastness to waste gases by incorporating therein a stabilizing amount of an organic compound having a group 1, which is at least one tertiary aliphatic amino group and a group 2, which is at least one group, that can react with the polyurethane-elastomer, such as an ethyleneimine, epoxy, isocyanate, isocyanate splitting, methylol or metholether group. The tertiary amino group has substituents, where all the carbon-atoms bound directly to the nitrogen atom are aliphatic C-atoms. The tertiary amino-compound shall contain these tertiary amino groups in a concentration of at least 250 milliequivalents per kilogram of the additive.

These substances, containing aliphatic amino groups and reactive fixing groups, are subsequently reacted with the polyurethane compositions by a chemical reaction which may be initiated only at elevated temperatures. These substances are firmly bound to the polyurethane molecule by chemical bonds. This is extremely important in the practical application of such modified polyurethane products especially in the form of threads and foils owning to their relatively high surfaces so that extraction of the additives with consequent reduction or loss in the desired effects will not take place during washing and dyeing processes which are usually carried out in boiling acid or alkaline baths.

The term "spandex fiber" is used in its generic sense to mean a manufactured fiber in which at least 85% of the fiber-forming substance is a long-chain synthetic segmented polyurethane. It is not intended, however, that the invention be limited to fibers of such segmented polyurethanes since the stabilization is achieved with other shaped articles such as films and the like. The segmented polyurethanes which provide spandex fibers contain the recurring linkage —OCONH—. The preferred spandex fibers are those prepared from segmented polyurethanes in which the urethane nitrogen is joined to an aromatic radical. Such polyurethanes appear to be most susceptible to the degradative action of acid fumes. Generally speaking, the segmented polyurethanes are prepared from hydroxyl-terminated compounds such as hydroxyl-terminated polyethers and polyesters of low molecular weight, which in reaction with a molar excess of organic diisocyanate, preferably an aromatic diisocyanate, produces an isocyanate-terminated polymeric intermediate which may then be chain extended with a difunctional active hydrogen-containing compound such as water, glycols, amino alcohols, hydrazine, organic diamines and especially carbohydrazide and organic dihydrazide compounds.

Among the segmented polyurethanes of the spandex type are those described in several patents among which are German Patent 1,123,467 (U.S. Ser. No. 129,964). German Patent 1,157,386 (U.S. Ser. No. 306,271), U.S. Patents 2,929,801, 2,929,802, 2,929,803, 2,929,804, 2,953,839, 2,957,852, 2,962,470, 2,999,839, and 3,009,901. As described in the aforementioned patents, the segmented polyurethane elastomers are comprised of amorphous segments derived from polymers having a melting point below about 50° C. and a molecular weight above about 600 and contain from about 5% to 40% of crystalline segments derived from a polymer having a melting point above about 2 00°C. in the fibre-forming molecular weight range. Most of such polyurethanes, when in filament form, have elongations greater than 50%, tensile recovery of over 90%, and a stress decay of less than 20%, as defined in U.S. Patent 2,957,852. This invention is particularly effective when applied to the spandex fibres derived from dihydrazide compounds especially carbohydrazide (German Patent 1,123,467) aliphatic diamines and hydrazine as described in U.S. Patent 2,957,852, and this category of spandexes is preferred in the practice of this invention.

In the polyurethane compositions modified according to the invention, on the other hand, the additives are linked to the polyurethane molecule by chemical bonds. This obviates the difficulties because the products are liable to be washed out when not fixed. Also, with regard to the molecular weight of the tertiary amine compounds, no limitations need be made since the solubility of the additives to the polymers would in fact be a "solubility" of the high molecular weight polymers which may even be cross-linked. However, the additives should not be so highly volatile that they evaporate already during the forming process or removal of the solvent before the fixing reaction has set in.

Agents that can be used according to the invention are, for example, compounds of the formula

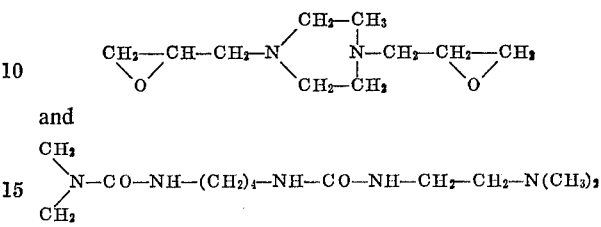

and $CH_3$
$\ $
$N-CO-NH-(CH_2)_4-NH-CO-NH-CH_2-CH_2-N(CH_3)_2$
$/$
$CH_3$

These compounds have relatively low molecular weights and are firmly bonded in the polymers after fixation by heat, so that the fact they themselves are water-soluble or soluble in dilute acids before they are fixed is of no importance. Tertiary amines of comparable molecular weight, e.g. N,N-diisobutyl-hexamethylene diamine, on the ohter hand are easily removed from the fibers by washing.

The tertiary aliphatic amine compounds may have one or several aliphatic substituted tertiary amino groups together with one or more fixing groups. The substituents of the tertiary N-atom may be in the form of chains or may be cyclic, and the alkylene groups in the chains as well as in the cyclic rings may be interrupted by hetero atoms, (for example O, N) or may also be araliphatic radicals.

As fixing group, the tertiary aliphatic amine compounds may contain at least one ethyleneimino- or epoxy group, and isocyanate splitting groups are also very suitable. Free isocyanate groups are possible as fixing groups, but the use of such agents is more difficult, particularly if the polyurethane to be modified still has groups that are highly reactive with isocyanate groups, e.g. amino- or semiccarbazide- end groups. As fixing groups may also be used N-methylol- or N-methylolether groups, e.g. of amides, ureas, hydrazides and semicarbazides. Fixing groups with an ethyleneimine radical, e.g., ethyleneimide groups

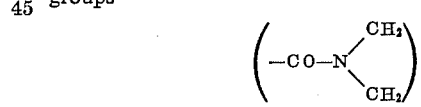

or ethyleneimide urea groups

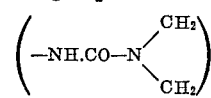

or with an epoxy radical are distinguished by the fact that they can be added to the polyurethane compositions or polyurethane solutions without a reaction at first taking place. A reaction occurs only when the substance, which may already be the finished formed article, is heated. A similar behavior is shown by isocyanate splitting groups used as fixing groups.

Methylol compounds of amides or polyamides, ureas, or polyureas, semicarbazides or similar compounds with —CONH— groups and the resulting methylol ethers may be prepared in situ by the action of formaldehyde (or formaldehyde and alcohols) on substances containing amide, urea or semicarbazide groups, with or without isolation of the product.

It is desirable to use those tertiary aliphatic amine compounds which have a high content of tertiary amino groups. This should preferably be more than 250 milliequivalents of tertiary amino groups per kg. of the additive and have an average value of above 500 milliequivalents, preferably in the range of 2000–5000 milliequivalents tert. N/kg. It is also desirable only to use agents which have only as many "fixing groups" as is absolutely necessary. If the agent contains more than one fixing group per molecule, cross-linking takes place in the reaction with the polyurethane, and this may in some cases even be desirable since solubility and mechanical behavior may thus be influenced. However, it will generally be desirable to avoid coupling the cross-linking and the improvement of the dyeability, light fastness and fastness to waste gases by the agents used according to the invention, because by means of the invention it is possible to vary the dyeability, light fastness and fastness to waste gases independently of the mechanical properties.

The agents to be used according to the invention may be low molecular weight or high molecular weight compounds. For reasons of solubility and working up it will generally be preferable to use relatively low molecular weight compounds with a molecular weight of about 200 to 1500. On the other hand, polymer compounds with molecular weights above 2500 have the advantage that they can be fixed to the polyurethane molecule with a much lower concentration of fixation groups.

The following are examples of tertiary aliphatic amine compounds suitable for use according to the invention:

Reaction products of polyisocyanates, preferably triisocyanates and higher functional polyisocyanates with alcohols or primary or secondary amines carrying also aliphatic substituted tertiary amino-groups in the molecule, such as, for example, 1-amino-2,2-dimethylamino-ethane, 1-amino-3,3-dimethylamino-propane, 1-amino-3,3-diethylamino-propane, 1-diethylamino-4-amino-pentane, N - methyl-N-(3-aminopropyl) - ethanolamine, ε-amino-caproic acid-(N-3-diethylaminopropane)-amide, N-methyl-N-β-aminoethyl-piperazine, 1-hydroxy - 2,2 - dimethylamino-ethane, 1 - hydroxy-2,2-diethylamino-propane, β-hydroxyethyl-piperidine, N - (ω - hydroxyethyl)-N'-carboxylic acid-dimethylhydrazide-piperazine with the proviso that these amines saturate only 50% (in the case of diisocyanates) or at the most 66% (in the case of triisocyanates) of the isocyanate groups present in the molecule. The remaining NCO groups may be treated either before or simultaneously with or after the reaction with the above amines with compounds which introduce or lead to the formation of these "fixation groups." This may be done particularly advantageously, for example, by reacting with ethyleneimine. This reacts with the isocyanates with formation of ethyleneimide ureas which are stable at room temperature but react with the polyurethane molecule in a subsequent heat treatment. Any of the polyisocyanates mentioned hereinafter with regard to the preparation of the polyurethane may be used to prepare the additives.

The following are examples:

cially in the form of isocyanate splitters, e.g. phenol splitters) may be caused to react with reactive parts of the polymer (e.g. end groups or at elevated temperatures with —NHCO groups from the chains).

Suitable compounds are carrying epoxy groups, such as piperazino-N,N'-bis-epoxypropane or N-methyl-N'-epoxypropane-piperazine or reaction products for example of isocyanates or polyisocyanates with compounds such as piperazino-N-epoxypropane e.g. reaction products of the biuret-triisocyanate of hexandiisocyanate (see above) with 3 mols of piperazino-N-epoxy-propane. In these compounds, the epoxy group reacts with polyurethane in the subsequent heat treatment.

Copolymers containing predominantly acrylic- or methacrylic acid-(β-diethylaminoethyl)-ester or acrylic- or methacrylic acid-(β-dimethylaminoethyl)-ester and glycidylmethacrylate.

Very suitable compounds are the reaction products of polymeric acrylic- or methacrylic-acid - (β - isocyanato-ethyl)-ester, polymeric 3-isocyanato-styrol, polymeric vinylisocyanate or polymeric toluylene-2-isocyanato-4-(ω-allylurethane) with monofunctional compounds with one group-containing active hydrogen, which may react with isocyanates, such as alcohols or amines, containing one or more suitable tertiary amine groups, e.g. 1-hydroxy-2-dimethylamino-ethane or 1-amino - 3 - diethylamino-propane (as stabilizing and dyestuff attracting grouping) and ethylene imines (e.g. ethyleneimine, 2-methyl-ethyleneimine) or epoxy-compounds, e.g. piperazine-N-epoxy-propane (as "fixation grouping"), where at least 50% of the isocyanate groups are reacted with the monofunction compounds, containing one or more tertiary amine grouping.

The reaction products of formaldehyde and ureas, e.g. of 1 mol hexane diisocyanate and 2 mols 1-amino-3-diethyl-aminopropane, ureas from a biuret triisocyanate (from hexane diisocyanate and water) and equivalent quantities of 1-amino-3-dimethylaminopropane or polyureas from diamines or mixtures of diamines containing one or more aliphatic tertiary N-groups (e.g. bis-γ,γ'-aminopropyl-methylamine; γ,γ'-bis-(aminopropyl)-ethylamine, N'-diethylaminopropyl-propylenediamine-1,3, 3-dimethylamino - hexanediamine - 1,6,3 - diethylamino-hexane - diamine-1,6, 3,3'-diethylpropylene-1,1-bis(γ-propylamino) - diamine, N,N'-bis(β-ethylamino)-piperazine, N,N'-bis(γ-propylamino)-piperazine, N,N' - dimethyl-N,-N'-bis-γ-aminopropyl-ethylene-diamine) and diisocyanates (such as given as examples for the production of the polyurethane-elastomers) or from formaldehyde and polyurethanes from dihydroxy-compounds, containing one or more tertiary aliphatic amino groups (such as 2-methyl-2-dimethylamino-propanediol-1,3, bis-hydroxyethyl-meth-

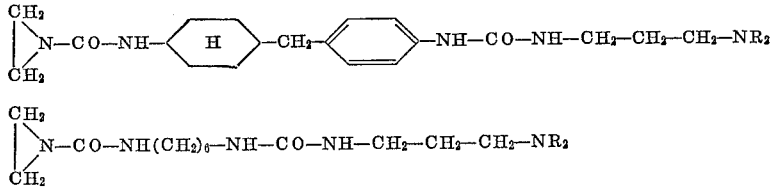

(R is for example, CH$_3$, C$_2$H$_5$, isopropyl, propyl, butyl, amyl) and in addition, reaction products of the biuret triisocyanate from hexane diisocyanate and water (see Houben-Weyl 14/II, page 69) or of trifunctional isocyanate from 3 mols toluylene-2,4-diisocyanate and 1 mol 1,1,1-tri(hydroxymethyl)-propane (Houben-Weyl 14/II, page 67) or trimeric triisocyanate from toluylene-2,4- or -2,6-diisocyanate with about 33.3 to 66.6% ethyleneimine and 66.6 to 33.3% tertiary amine compounds such as those given above as examples.

If, for example, a triisocyanate is reacted with only two equivalents of an amine, e.g. 1-amino-3-diethyl-aminopropane, the remaining isocyanate groups (especially ylamine, bis-β-hydroxypropylmethylamine, bis-β-hydroxypropyl-ethylamine, N,N'-bis-β-hydroxyethyl-piperazine, N,N' - bis - β - hydroxypropyl-piperazine, N,N'-bis-β-hydroxy-propyl-N,N'-dimethyl-ethylenediamine - 1,2) and diisocyanates (such as given as examples for the production of the polyurethane-elastomers) or from formaldehyde and polyamides from diamines or mixtures of diamines with one or more aliphatic tertiary amine groups (such as given as examples for the production of polyureas) and dicarboxylic acids such as adipic acid, oxalic acid, sebacic acid, isophthalic acid, N-methylamino-bis-propionic acid or their esters or acid-halide-derivatives.

The tertiary aliphatic amine compound can be essentially defined by the following general formulae:

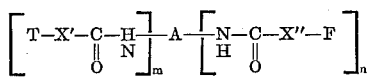

wherein the symbols have the following meaning:

A=rest of a polyisocyanate with the functionality ($m+n \geq 2$) (suitable polyisocyanates are set forth in the description) X′=—NH— or —NR— or —O—; (R=lower alkyl-groups $C_1$–$C_6$); T=rest of the hydroxy- or amino-compound, which also has a tertiary, aliphatic substituted amino-group [(examples for the hydroxy or amino-compounds HX′-T are given in the description)]; X″=—NH— or —NR— or —O— (R=lower alkyl-groups $C_1$–$C_6$) bonded to the group F where F=rest of a compound, carrying epoxy groups (see examples in the description); X″F may be a (substituted) ethyleneimine rest

(R=lower alkyl $C_1$–$C_6$ or phenyl) or the rest of a isocyanate splitting group, e.g. $C_6H_5O$—; $m \geq 1$; $n \geq 0$; $m+n \geq 2$ (functionality of the polyisocyanate) when $n=0$, at least one NH— group in the molecule must be substituted by a N-methylol- or N-methylothether-group, and II.

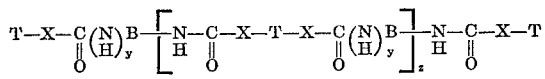

wherein the symbols have the following meaning: B=residue of a diisocyanate (for diisocyanates see the examples given in the description) or the residue of a dicarboxylic acid (see examples given in the description), when $y=0$; $Y=0$, 1; X=—NH—, —NR—, —O— (R=lower alkyl-groups $C_1$–$C_6$); T=monofunctional (when $Z=0$) or difunctional (when $Z \geq 1$) compound with one or two groups, XH respectively and at least one tertiary, aliphatic substituted N-atom (examples given in the description); $Z \geq 0$. These compounds, containing tertiary amino groups can be reacted with formaldehyde on one or more of the —NH-groups to form the methylol-derivates, by which then the additives can be fixed to the polyurethane elastomer.

These agents are added in quantities of 0.1–10% by weight preferably 0.5 to 5% by weight to the solutions of high polymer polyurethanes or to the polyurethane compositions. To obtain sufficient dyeability (both as regards absorption rate as regards saturation limit) it is desirable to use about 10 to 400 milliequivalents of tertiary aliphatic amino groups, preferably about 25 to 300 milliequivalents and with best effects about 100–300 milliequivalents in 1 kg. of solid polyurethane composition.

By suitable choce of the proportion of tertiary amino groups it is then possible to obtain modified polyurethanes, especially polyurethane fibers, with which a tone-in-tone dyeing can easily be achieved with the particular surrounding yarns of core spun yarns or other fabric components.

All polyurethane compositions whose molecules contain groups capable of reacting with the reactive "fixation groupings" of the modifying components may be modified according to the invention such as those prepared by reacting an organic compound containing active hydrogen atoms, an organic polyisocyanate and if desired, a chain extending agent.

Any suitable organic compound containing active hydrogen atoms which are reactive with NCO groups such as, for example, hydroxyl polyesters, polyhydric polyalkylene ethers, polyhydric polythioethers, polyacetals and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxy methyl cyclohexane) and the like. Preferred polyesters contain adipic, acelaic, or sebacic acid and glycols or mixtures of glycols with five or more carbon atoms, e.g. 2,2-dimethyl-propanediol-1,3 and hexanediol-1,6. Good properties can be obtained also from polyesters, derived from lactones, such as ε-caprolactone and a little amount of a dihydric alcohol, e.g. butanediol-1,4. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, β-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2′-diphenylpropane 4,4′-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide, styrene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3′-dihydroxy propyl sulfide, 4,4′-dihydroxy butyl sulfide, 1,4-(β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should preferably be substantially linear or only slightly branched and have a molecular weight of about 500 to 5000 and for best results, a molecular weight of from about 1500 to about 3000, an hydroxyl number of from about 75 to about 35 and an acid number less than about 2.

Any suitable organic diisocyanate may be used in reaction with the organic compound containing active hydrogen atoms to produce polyurethane polymers such as, for example, ethylene diisocyanate, ethylidene diisocyanate, propylene diisocyanate, butylene diisocyanate, pentamethylene-diisocyanate, hexamethylene diisocyanate, cyclopentylene - 1,3 - diisocyanate, cyclohexylene - 1,4 - diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, p-xylylene diisocyanate, m-xylylene diisocyanate, 1,4-naphthylene diisocyanate, 1,5-naphthylene diisocyanate, diphenyl - 4,4' - diisocyanate, azobenzene-4,4'-diisocyanate, diphenylsulphone - 4,4' - diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or toluylene diisocyanate have proven to be especially suitable.

Any suitable chain extending agent containing active hydrogen atoms which are reactive with NCO groups and having a molecular weight less than about 500 may be used such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(β-hydroxy ethyl ether), 1,3-phenylene-bis-(β - hydroxy ethyl ether), bis - (hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, m-xylylene diamine, 3,3'-dichlorobenzidene, 3,3'-dinitrobenzidene, 4,4'-methylene-bis(2-chloroaniline), 3,3-dichloro-4,4' - biphenyl diamine, 2,6 - diamino pyridine, 4,4' - diamino diphenylmethane and the like; alkanol amines such as, for example ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene - disulfonic acid dihydrazide, omega - aminocapronic acid dihydrazide, gamma-hydroxy butyric hydrazide, bis-semicarbazides, bis-hydrazine carbonic esters of glycols such as many of the glycols heretofore mentioned and the like.

For example, linear polyurethanes may be produced in the melt from high molecular weight polyhydroxyl compounds such as polyesters, polyethers, poly-N-alkylurethanes, diisocyanates and glycols and they may then be dissolved in highly polar organic solvents such as dimethylformamide, dimethylacetamide, dimethylsulphoxide, tetramethylene sulphone.

However, it is preferred to prepare NCO-containing preadducts in the above highly polar solvents by direct reaction with approximately equivalent quantities of chain-lengthening agents, the polyurethane being then formed into threads or foils after the addition of the desired additives. This method is preferred particularly for the highly reactive aliphatic diamines, hydrazines as well as for hydrazide compounds.

The addition of the modifying components may be carried out not only after the formation of the polyurethane but also to one of the components, e.g. to a solution or, at room temperature or only slightly elevated temperatures, to the liquid melt of the NCO pre-adducts or to the solution of the chain lengthening agent. However, with this method no NCO group should be used as fixation group in the modifying component because they interfere with the building up of the polyurethanes by taking part in the NCO addition reaction.

The polyurethane solutions are preferentially formed into highly elastic threads by dry spinning processes.

In a further process for producing highly elastic threads in which the melt or solution or an NCO preadduct is spun into a solution of aliphatic diamines, for example, in water and/or in alcohols with immediate reaction to the polymers under simultaneous formation into threads, the modifying component can be added to the melt or solution of the NCO pre-adduct. The modifying component, which in this case is preferably so chosen that it has as low a solubility in water as possible, is at first only a filler inside the thread composition and it is only afterwards, in the thermal after-treatment, that it is fixed to the polyurethane in a chemical reaction.

It is to be regarded as a very great advantage of the method described that the polyurethane elastomers can first be built up without any alteration in the recipes and the modification of the finished polyurethane compositions can subsequently be carried out by reaction with the modifying agents.

Although it would also be possible to incorporate tertiary amino groups by replacing a diamine normally used by a diamine having one tertiary amino group (e.g. γ,γ'-bis-aminopropyl-N-methylamine), the build-up of the polyurethane would have to be so basically altered in order to introduce a sufficient concentration of tertiary amino groups into the polyurethane that many of the desired properties of the elastomers would be lost.

If the "fixation" of the agent used according to the invention to the polyurethane is achieved by a thermal after-treatment, temperatures of about 50 to 150° C., preferably 95 to 130° C., are generally required for this purpose; the length of time for the heat treatment lies between a few minutes and several hours and can be determined by suitable preliminary tests. A thermal after-treatment of 30 to 60 minutes will generally be sufficient at about 100–130° C. and of 60 to 600 minutes at about 80–100° C.

Within the polyurethane compositions there are marked differences in the ease of "fixation" of the modifying components to the polyurethane molecule. Polyurethanes which react preferentially and easily are those which have been built up with water, diamines, hydrazines and especially hydrazide compounds as chain-lengthening agents since the —NHCO-groupings in the polyurethane compositions constitute preferential points of attack for all "fixation groupings" of the modifying components. Particularly reliable "fixation" to the polyurethane is obtained with products which have ethyleneimide or epoxy groups at their disposal.

The thermal after-treatment may at the same time, initiate other reactions, e.g. with cross-linking agents. Formation of the threads may also be carried out at the same time with improvement of the properties. It has also been found that a slight reddish discoloration which may occur both in the solution and in the resulting films or threads, for example, when tertiary amine-containing modifying agents are added to polyurethanes that have been chain-lengthened with carbohydrazide disappears again on thermal after-treatment (e.g. one hour at 130°).

The invention is further illustrated but not limited by the following examples in which parts are by weight unless otherwise specified.

EXAMPLE 1

(a) Preparation of the polyurethane solution

About 6,000 parts of a copolyester formed from adipic acid 2,2-dimethylpropanediol-1,3 and hexanediol-1,6 (molar ratio of glycols 35:65; hydroxyl number 67) are heated to from about 96 to about 98° with 1,630 parts of freshly distilled diphenylmethane-4,4'-diisocyanate and about 1,920 parts chlorobenzene for about 65 minutes. The NCO content after cooling in an ice bath is 2.45%.

About 8,630 parts of the above NCO adduct solution are added within about one hour to a stirred, 70° C. hot solution of about 230 parts of carbodihydrazide in 18,950 cyanate with two equivalents of 1-hydroxy-2-dimethyl-amino-ethane and 1 equivalent 2-methyl-ethyleneimine or 3% of the reaction product of the polymeric methacrylic-acid (ω-isocyanato-ethyl)ester having a molecular weight of about 1500 with 90% 1-amino-3-diethylamino-propane and 10% ethyleneimine (percent of the NCO-equivalents).

| Dyestuff | Quantity, percent | Dyeing method | Modification Without | Modification With | Modified fiber absorbs dyeing bath quantitatively=qu |
|---|---|---|---|---|---|
| Acid dyestuffs: | | | | | |
| Yellow according to German Patent 705,780 | 2 | A | Yellow | Intense yellow | qu |
| Blue according to German Patent 456,114 | 2 | A | Pale blue | Deep blue | qu |
| Red according to German Patent 230,594 | 2 | A | Pale orange | Deep orange | qu |
| Green according to German Patent 602,959 | 2 | A | Pale green | Deep green | qu |
| Metal complex dyestuffs: | | | | | |
| Yellow according to German Patent 929,567 | 2 | B | Yellow orange | Brilliant yellow orange, | qu |
| Red according to German Patent 953,872 | 2 | B | Pale red | Red | qu |
| Black according to German Patent 1,083,959 | 10 | B | Grey black | Black | |
| After chroming dyestuffs: | | | | | |
| Red according to German Patent 269,213 | 2 | C | Pale pink | Deep red | qu |
| Black according to German Patent 164,655 | 10 | C | Brownish dark grey | Black | | parts of dimethylformamide and pigmented with 550 parts of a 33% titanium dioxide paste.

(b) Preparation of the modifying component

About 100 parts of a 76% ethyl acetate solution of biuret triisocyanate (from hexane diisocyanate and water; NCO content 17.10%) are diluted with about 100 parts of dimethylformamide and a mixture of about 35.4 parts of 1-amino-3-diethylamino-propane (⅔ of the NCO equivalent) and about 5.845 parts of ethyleneimine (⅓ of NCO equivalent) in about 200 parts dimethylformamide is added dropwise with very brisk stirring and cooling with ice.

(c) Modification of the polyurethane

About 400 parts of the solution of modifying component are dissolved in about 10,000 parts of the polyurethane solution. In addition, about 63 parts of an 84% dioxane solution of a trisaziridine-urea (reaction product of the biuret triisocyanate described under (b) with the quantity of ethyleneimine equivalent to the NCO groups) are homogeneously distributed as cross-linking agent in the solution. The solution becomes very slightly red in the process.

Films of 0.2 mm. thickness are obtained from a part of the solution by pouring onto glass plates and drying for one hour; the films are colored very slightly pink.

The films can be stripped from the glass plate and can be handled without the use of talcum.

After one hour's heating at about 130° C., the films are colorless.

Exposures in the fadeometer show a markedly reduced tendency to yellowing up to about 25 hours compared with films without modifying agent; the discoloration after 1½ hours' exposure to combustion gases at about 85 to about 90° C. is also reduced from yellow (without additive) to almost colorless (with additives).

Threads of about 400 den are spun under the same spinning conditions by the dry spinning process both from the above elastomer solution with modifying agent and, for the sake of comparison, from the same elastomer solution, but without the addition of modifying agent, and both threads are heated for one hour at 130° C.

The dyeability of the threads with added modifying agent is very much increased especially with respect to acid-, metal complex- and chrome dyestuffs. The absorption rate of the dyestuffs and the depth of color that can be obtained are much greater than in the case of the unmodified elastomeric fibers.

Similar improvements can be effected by adding to the polyurethane-solution 5% of the reaction product of a triisocyanate from trimethylolpropane and toluylenediiso- Dyeing instruction A Heat the dye in 2% acetate acid (60%) to boiling temperature and dye for 1–1½ hours at boiling temperature.

Dyeing instruction B

Heat the dye with or without the aid of 1–2% equalizing agent, with 1% acetic acid (60%) at 50° to boiling and to keep boiling for one hour after the further addition of 2% acetic acid (60%).

Dyeing instruction C (a) Heat the dye to boiling with 2% acetic acid (60%) and dye at boiling temperature for one hour with the addition of 4% formic acid (85%).

(b) Heat the well-washed dyeing to boiling with 3% potassium dichromate/5% formic acid and chrome at the boiling temperature for 1–1½ hours.

EXAMPLE 2

About 3% by weight (calculated on the solids content) of piperazino-N,N'-bis-epoxypropane are added to the polyurethane solution of Example 1 and the solution is poured to form films. The solutions and the films are colored slightly red. The coloration disappears after heating the films (1 hour at 130°).

The films are cut into threads with a foil cutting machine and dyed with 2% of a red acid dyestuff according to German Patent 230,594 in solution in acetic acid.

In contrast to the threads without additive, which are only slightly colored and have far from exhausted the dye bath, the threads to which modifying agent has been added are intensely colored and have absorbed the dyestuff quantitatively from the dyebath. The films and threads have become insoluble after heating in dimethylformamide and dissolved only above 100° C.

EXAMPLE 3

(a) About 14.88 parts (40 mmol.) of a basic bisurea obtained from 1 mol hexane diisocyanate and 2 mols 1-amino-3-dimethylaminopropane (M.P. 164–165°) are suspended in about 40 parts by volume of water and treated with about 20 parts (200 mmol.) 30% formaldehyde solution and 5 parts by volume of triethylamine. The mixture is heated for about 2 hours under a reflux cooler with stirring and all the volatile constituents are then removed in a water jet vacuum at a bath temperature of about 60 to about 90°. A highly viscous oil remains behind.

(b) By a method similar to that under (a), about 17.12 parts (40 mmol.) of a basic bisurea obtained from 1 mol hexane diisocyanate and 2 mols 1-amino-3-diethylaminopropane (M.P. 123–125°) are treated with formaldehyde. A colorless highly viscols oil is obtained.

(c) About 3% of each of the substances (a) and (b), calculated on the solid substance, are stirred into the polyurethane solution of Example 1 and the solutions are poured out to form films, (dry temperature 100°). After heating the films for about one hour at 130° C., they have become insoluble in diemthylformamide. After cutting the films into threads, the threads are dyed with about 2% of a red acid dyestuff according to German Patent 230,549 in accordance with receipe A give in Example 1 for acid dyestuffs.

Whereas threads having no modifying component take on only a pale orange color, the threads modified by the addition of 3% (a) or 3% (b) become strongly colored, the dyestuff being absorbed quantitatively on the threads.

Similar effects are found by the addition of 3% by weight of a basic polyurea of hexane-diisocyanate and 3-dimethylaminohexane-diamine-1,6, reacted with formaldehyde or a basic polyurethane of toluylene-2,4 - diisocyanate and bis-(β-hydroxypropane)-methylamine, reacted with formaldehyde, to the solution of the segmented polyurethane of Example 1.

EXAMPLE 4

About 500 parts of the NCO preadduct of Example 1 (2.45% NCO) are introduced into a solution of about 7.40 parts of hydrazine hydrate in about 1100 parts of dimethylformamide with intense stirring and the highly viscous solution thus produced is then treated with about 10.1 parts of $TiO_2$. About 1000 parts of the polyurethane solution are treated with about 38 parts of the solution of modifying components of Example 1 and the solution is cast into films. After a heat treatment at about 130° C., the films show less yellow discoloration in combustion gases, less discoloration on exposure to light in the fadeometer and a markedly improved dyeability with acid and chrome dyestuffs compared with foils made from the elastomer solution without addition of the modifying components. Thus, for example, when dyeing with a red acid dyestuff according to German Patent 230,594, (2% dyestuff) complete exhaustion of the dyestuffs is achieved.

EXAMPLE 5

About 600 parts of an adipic acid-ethylene/butanediol (1:1) polyester (OH number 58.8) are heated to about 96 to about 98° for about 75 minutes with about 157.5 parts diphenylmethane-4,4'-diisocyanate and about 191 parts chlorobenzene. The NCO content of the preadduct after cooling is 2.83% NCO.

About 518 parts of the above NCO preadduct solution are run into a solution of about 20.95 parts N,N'-diamino-piperazine in about 1100 parts dimethylformamide with stirring until a clear, colorless polymer solution having a viscosity of 666 poises/20° is produced. After pigmenting with about 2.5% $TiO_2$ (calculated on the solids content of the solution), foils (0.2 mm.) are cast.

About 35 parts of the solution of modifying agent given in Example 1 are stirred into about 1000 parts of the solution and films are then cast. After heat treatment (one hour at 130° C.) the films are cut into threads and dyed. In contradistinction to the films without modifying components, a marked improvement in the dyeability is found. Thus, dyeing with 2% of a red acid dyestuff according to German Patent 230,594 produces only slight coloration in threads containing no modifying agent whereas the dyebath is completely absorbed already after about 30 minutes with modified threads.

EXAMPLE 6

About 1000 parts of a copolyester of adipic acid and ethylene glycol-butanediol (molar ratio of glycol 1:1); (OH number 55.0; acid number 0.70; water content 0.01%) are mixed with about 93.0 parts of butanediol-1,4 and about 14.4 parts of titanium dioxide (rutile) and about 0.31 part of iron-(III)-acetylacetone at about 60°, and about 400 parts diphenylmethane-4,4'-diisocyanate are quickly added with stirring. After a mixing time of about 3 minutes, the melt is poured into flat dishes and then heated in an oven at about 110° for about 15 minutes and the polyurethane composition, which is already solidified, is removed and then granulated when cold.

To prepare a solution, about 660 parts granulated polyurethane are added portionwise to about 2340 parts dimethylformamide at about 60 to about 70° C. with stirring until complete solution has set in after about 8 hours. The viscosity of the solution is 925 poises at 20°.

About 33.2 parts of a 26.5% solution of the modifying agent used in Example 1 are added to about 1000 parts of the resulting solution. Foils are cast from the solution as well as from solutions containing no modifying agent, and heated for another hour at about 130° after drying.

The following results are obtained when dyeing with an acid dyestuff and an after-chroming dyestuff:

| Dyestuff | Quantity, percent | Dyeing process | Without Additive | With modifying agent |
|---|---|---|---|---|
| Red acid dyestuff according to German Patent 230,594. | 2 | A—Example 1 | Pale orange | Deep orange red (dyestuff absorbed quantitatively). |
| Black after-chroming dyestuff according to German Patent 164,655. | 10 | C—Example 1 | Brownish grey | Black. |

It is, of course, to be understood that the examples are for the purpose of illustration and not by way of limitation and that any of the reactants or stabilizers set forth in the specification can be used in place of those specifically used in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What we claim is:

1. A fiber consisting of a long chain synthetic elastomer comprising at least 85% of a segmented polyurethane having improved dyeability, light fastness and fastness to waste gases by having chemically incorporated therein 0.1 to 10% by weight of a stabilizing compound having (1) at least one tertiary aliphatic substituted amino group and (2) at least one reactive group selected from the class consisting of ethyleneimido groups, epoxy groups, N- methylol groups and N-methylolether groups said quantity stabilizing compound containing from about 10 to about 400 milliequivalents of tertiary aliphatic amino groups per kilogram of solid polyurethane composition, said stabilizing compound being attached to the polyurethane chain by said reactive group by heating at a temperature of 50 to 150° C.

2. A fiber according to claim 1, wherein said stabilizing compound is a reaction product of (1) an organic polyisocyanate (2) a tertiary aliphatic substituted amino compound having at least one group containing active hydrogen atoms and (3) a compound containing a reactive group selected from the group consisting of an epoxy and an ethyleneimino compound.

3. A fiber according to claim 1, wherein said stabilizing compound is a reaction product of (1) an organic polyisocyanate with (2) a tertiary aliphatic substituted amino compound having at least one group containing active hydrogen atoms and (3) formaldehyde.

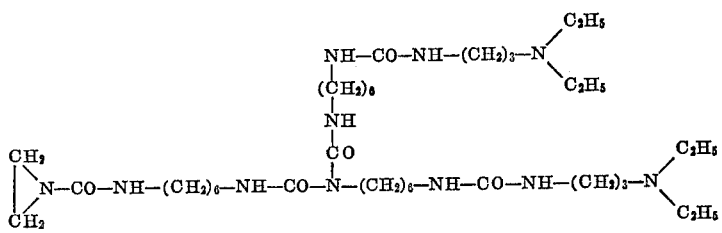

4. A fiber according to claim 2, wherein said organic polyisocyanate is hexane-1, 6-diisocyanate.

5. A fiber according to claim 2, wherein said organic polyisocyanate is a biuret triisocyanate.

6. A fiber according to claim 2, wherein said organic polyisocyanate is a triisocyanate obtained by reacting trimethylolpropane and toluylene diisocyanate.

7. A fiber according to claim 2, wherein said organic polyisocyanate is a polymer from methacrylic acid-(ω-isocyanatoethyl)-ester having a molecular weight of at least 750.

8. A fiber according to claim 2, wherein said tertiary aliphatic amino compound is 1-amino-3-diethylaminopropane.

9. A fiber according to claim 2, wherein said tertiary aliphatic amino compound is 3-dimethylamino-hexanediamine-1,6.

10. A fiber according to claim 2, wherein said tertiary aliphatic amino compound is 1-hydroxy-2-dimethylaminoethane.

11. A fiber according to claim 2, wherein the compound containing a reactive group is ethyleneimine.

12. A fiber according to claim 1, wherein said stabilizing compound is the compound of the formula 13. A fiber according to claim 1, wherein said stabilizing compound is piperazino-bis-(epoxypropane).

14. A fiber according to claim 1, wherein said stabilizing compound is the reaction product of (1) an excess of formaldehyde and (2) a compound of the formula

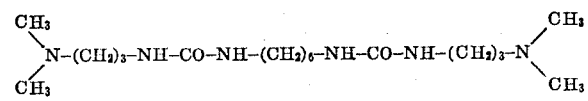

said compounds (1) and (2) having been heated under reflux to form said reaction product.

15. A fiber according to claim 1, wherein said stabilizing compound is the reaction product of (1) an excess of formaldehyde and (2) a compound of the formula

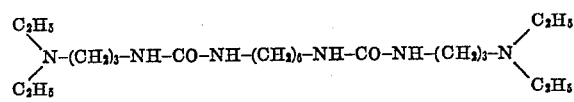

said compounds (1) and (2) having been heated under reflux to form said reaction product.

References Cited

UNITED STATES PATENTS

| 2,929,804 | 3/1960 | Steuber | 260—77.5 |
|---|---|---|---|
| 3,149,998 | 9/1964 | Thurmaier | 117—138.8 |
| 3,260,702 | 7/1966 | Murakami et al. | 260—77.5 |

FOREIGN PATENTS 1,353,195  1/1964  France.

DONALD E. CZAJA, Primary Examiner.

M. J. WELSH, Assistant Examiner.

U.S. Cl. X.R.

260—37, 75, 77.5